US008625116B2

(12) United States Patent
Hattori

(10) Patent No.: US 8,625,116 B2
(45) Date of Patent: Jan. 7, 2014

(54) MULTI-FUNCTION DEVICE

(75) Inventor: Hiroshi Hattori, Gifu-ken (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 919 days.

(21) Appl. No.: 12/551,598

(22) Filed: Sep. 1, 2009

(65) Prior Publication Data
US 2010/0053659 A1 Mar. 4, 2010

(30) Foreign Application Priority Data

Sep. 2, 2008 (JP) ................................. 2008-224803

(51) Int. Cl.
*G06F 3/12* (2006.01)

(52) U.S. Cl.
USPC ............................ 358/1.13; 359/1.15; 710/15

(58) Field of Classification Search
USPC ............ 358/1.13, 1.15, 296; 709/245; 710/15
See application file for complete search history.

(56) References Cited

U.S. PATENT DOCUMENTS

| 5,287,194 | A | * | 2/1994 | Lobiondo | 358/296 |
| 5,604,598 | A | * | 2/1997 | Shigemura | 358/296 |
| 6,697,165 | B2 | * | 2/2004 | Wakai et al. | 358/1.11 |
| 2002/0054329 | A1 | * | 5/2002 | Hiraoka | 358/1.15 |
| 2002/0186427 | A1 | | 12/2002 | Orikasa | |
| 2006/0253610 | A1 | * | 11/2006 | Yamada et al. | 709/245 |
| 2007/0035765 | A1 | * | 2/2007 | Corona | 358/1.15 |

FOREIGN PATENT DOCUMENTS

| JP | 11-017897 | | 1/1999 |
| JP | 11-127298 | A | 5/1999 |
| JP | 2002-374383 | | 12/2002 |
| JP | 2004-015696 | | 1/2004 |
| JP | 2004-153644 | | 5/2004 |
| JP | 2005-064657 | A | 3/2005 |
| JP | 2005-277885 | A | 10/2005 |
| JP | 08-018669 | | 1/2006 |

OTHER PUBLICATIONS

JP Office Action dtd Jul. 13, 2010, JP Appln. 2008-224803, English translation.

* cited by examiner

*Primary Examiner* — Allen H Nguyen
(74) *Attorney, Agent, or Firm* — Banner & Witcoff, Ltd.

(57) ABSTRACT

A multi-function device may be connected with a color printer capable of printing in a communicable manner. The multi-function device may be configured to store identification information of the color printer, to color-scan an object to be scanned, to monochrome-print based on first image data representing an scanned object, to allow a user to input an instruction, and to send second image data representing a color-scanned object with the identification information of the color printer as a destination if a predetermined instruction is input.

8 Claims, 14 Drawing Sheets

MULTI-FUNCTION DEVICE

CROSS-REFERENCE TO RELATED APPLICATIONS

This application claims priority to Japanese Patent Application No. 2008-224803, filed on Sep. 2, 2008, the contents of which are hereby incorporated by reference into the present application.

BACKGROUND

1. Field

The technique described in this specification relates to a multi-function device configured to execute a plurality of functions. More particularly, the technique relates to the multi-function device having at least a color-scanning function and a monochrome-printing function.

2. Description of the Related Art

A multi-function device having a color-scanning function and a monochrome-printing function is widely known. This type of the multi-function device can not perform color-printing. For example, color image data obtained by color-scanning is sent to a PC. A user can input, into the PC, an instruction for making another color printer perform a color-printing of the color image data. In this manner, the color image data is sent to the color printer and the color-printing is performed thereby.

BRIEF SUMMARY

In a case where the color image data created by the multi-function device is sent to the color printer via the PC, the time required to complete the color-printing becomes long. This specification provides a technique for shortening the time required to perform color-printing by another color printer based on color image data created by a multi-function device.

This specification provides a multi-function device that is to be connected with a color printer capable of color-printing in a communicable manner. Note that the above term "color printer" refers to a concept including any device having at least a color-printing function. The "color printer" may be a printer having only the color-printing function or a multi-function device having the color-printing function and a scanning function. Also, note that the above term "multi-function device" refers to a concept including any device having at least a scanning function and a printing function. The multi-function device may comprise an identification information storage unit, a color-scanning unit, a monochrome-printing unit, an instruction input allowing unit, and an image sending unit.

The identification information storage unit stores identification information of the color printer. The above term "identification information" refers to a concept including various types of information which can identify the color printer. For example, the identification information may be an IP address, a MAC address, or an e-mail address. The identification information storage unit may store the identification information input by a user. Alternatively, the identification information storage unit may store the identification information obtained by searching a network.

The color-scanning unit may be configured to color-scan an object to be scanned. The monochrome-printing unit may be configured to monochrome-print based on first image data representing an object scanned by the color-scanning unit. Note that the above "first image data" may be color image data or monochrome image data. In other words, the above "first image data" may be obtained by the color-scanning unit performing a color-scan or a monochrome-scan.

The instruction input allowing unit is configured to allow the user to input an instruction. The instruction input allowing unit may be, for example, an operation unit to be operated by the user. Also, for example, the multi-function device may employ a configuration which inputs the instruction output from an external device (for example, PC) that is separated from the multi-function device. In this case, the instruction input allowing unit may be, for example, an interface which inputs the instruction output from the external device. The image sending unit sends second image data representing an object color-scanned by the color-scanning unit with the identification information of the color printer as a destination, if a predetermined instruction is input in the instruction input allowing unit. The above term "predetermined instruction" may, for example, be put into a term "instruction for making another color-printer perform a color-printing". The above term "sends second image data . . . with the identification information of the color printer as a destination" may be, for example, an aspect which "the second image data is directly sent to the color printer corresponding to the identification information without going through another device" or an aspect which "the second image data is sent to the color printer corresponding to the identification information via another device such as a hub or a router, etc.".

DETAILED DESCRIPTION OF THE PREFERRED EMBODIMENTS (First Embodiment)

Figure 1:
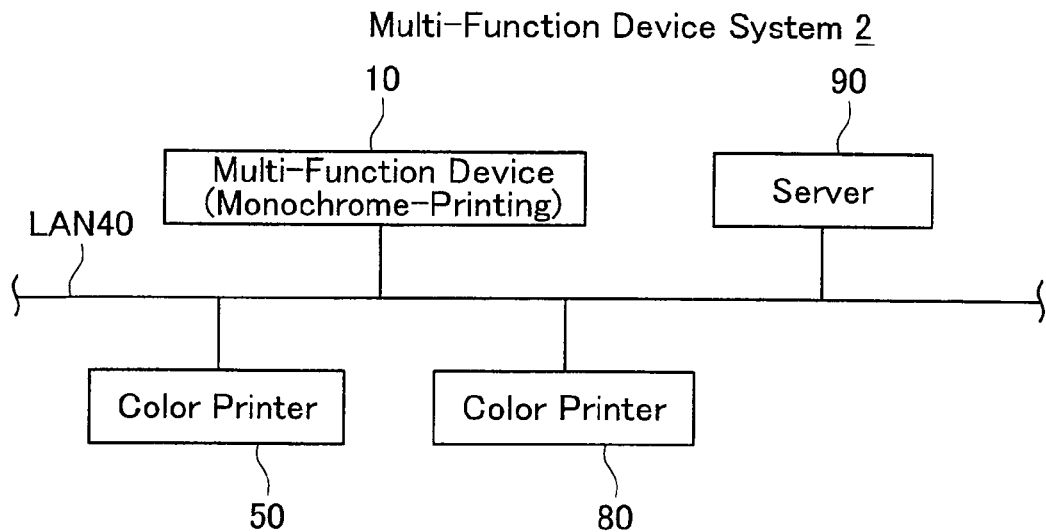
FIG. 1 shows a configuration of a multi-function device system.

A first embodiment will be described with reference to the drawings. As shown in FIG. 1, the multi-function device system 2 comprises a multi-function device 10, a plurality of color printers 50, 80, and a server 90, etc. Each device 10, 50, 80, 90 is connected to a LAN 40. Each device 10, 50, 80, 90 can communicate with each other via the LAN 40. Next, configurations of the multi-function device 10 and the color printers 50, 80 are described below. Note that, a configuration of the server 90 will be described in the third embodiment.
(Configuration of Multi-Function Device)

Figure 2:
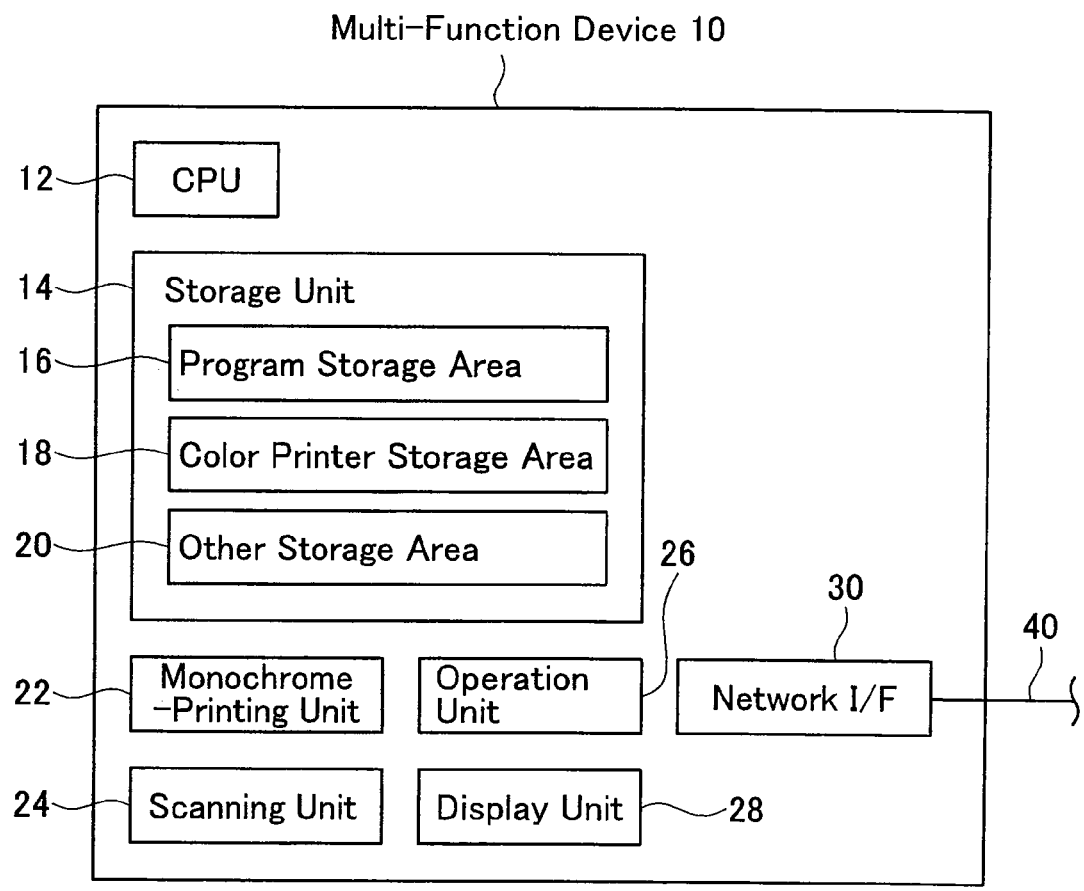
FIG. 2 shows a configuration of a multi-function device.

First, the configuration of the multi-function device 10 will be described. As shown in FIG. 2, the multi-function device 10 comprises a CPU 12, a storage unit 14, a monochrome-printing unit 22, a scanning unit 24, an operation unit 26, a display unit 28, and a network I/F 30, etc.

The CPU 12 executes various processes in accordance with programs stored in the storage unit 14. The processes executed by the CPU 12 will be described in detail later. The storage unit 14 includes a program storage area 16, a color printer storage area 18, and another storage area 20, etc. The program storage area 16 stores the programs executed by the CPU 12. The color printer storage area 18 can store an IP address of one color printer (for example, the color printer 50) and information relating to a data format that the color printer is capable of interpreting. The storage area 20 can store data (for example, scan data, PDL data, etc.) other than the data to be stored in the storage areas 16, 18.

The monochrome-printing unit 22 comprises a printing mechanism such as an ink jet type or a laser type, etc. The monochrome-printing unit 22 can print using black ink or black toner. The monochrome-printing unit 22 can only monochrome-print and can not color-print. The scanning unit 24 comprises a scanning mechanism such as a CCD or a CIS, etc. The scanning unit 24 can color-scan. The operation unit 26 comprises a plurality of keys. A user can input various instructions or information into the multi-function device 10 by operating the operation unit 26. The display unit 28 can display a variety of information. The network I/F 30 is connected to the LAN 40. The multi-function device 10 can communicate with each device 50, 80, 90 via the network I/F 30 and the LAN 40.
(Configuration of Color Printer)

Figure 3:
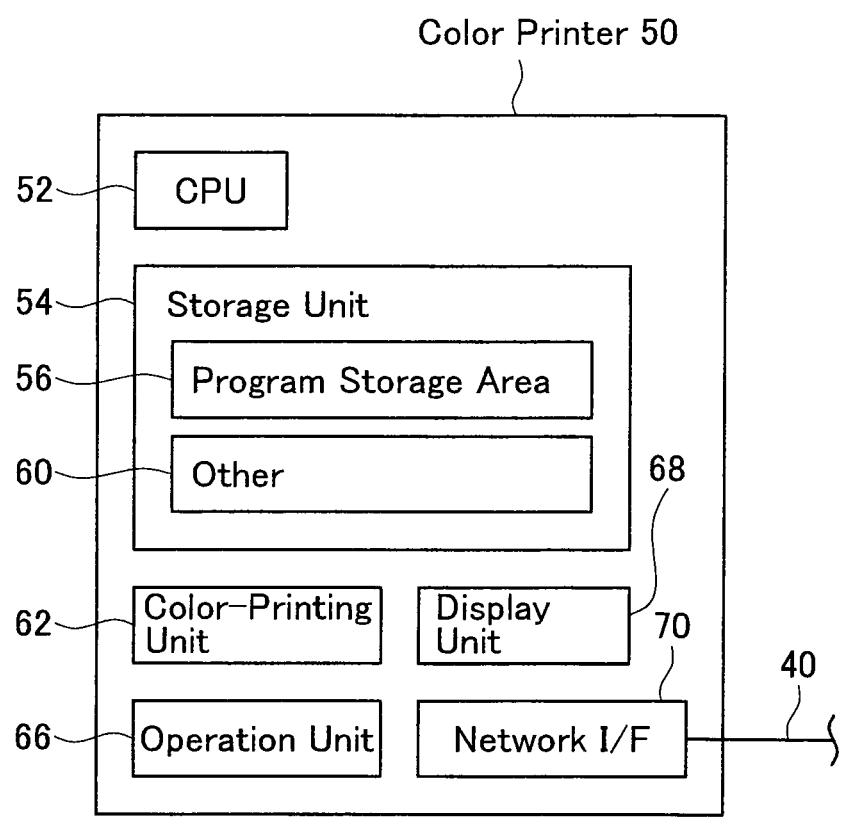
FIG. 3 shows a configuration of a color printer.

Next, the configuration of the color printer 50 will be described. The color printer 80 comprises the same configuration as the color printer 50. As shown in FIG. 3, the color printer 50 comprises a CPU 52, a storage unit 54, a color-printing unit 62, an operation unit 66, a display unit 68, and a network I/F 70, etc.

The CPU 52 executes various processes in accordance with programs stored in the storage unit 54. The processes executed by the CPU 52 will be described in detail later. The storage unit 54 includes a program storage area 56 and another storage area 60, etc. The program storage area 56 stores the programs to be executed by the CPU 52. The storage area 60 can store data (for example, PDL data from the multi-function device 10) other than the data to be stored in the storage area 56.

The color-printing unit 62 comprises a printing mechanism such as an ink jet type or a laser type, etc. The color-printing unit 62 can color-print using more than two different colors of ink or toner. The operation unit 66 comprises a plurality of keys. A user can input various instructions or information into the color printer 50 by operating the operation unit 66. The display unit 68 can display a variety of information. The network I/F 70 is connected to the LAN 40. The color printer 50 can communicate with each device 10, 80, 90 via the network I/F 70 and the LAN 40.
(Color Printer Setting Process Executed by Multi-Function Device)

Figure 4:
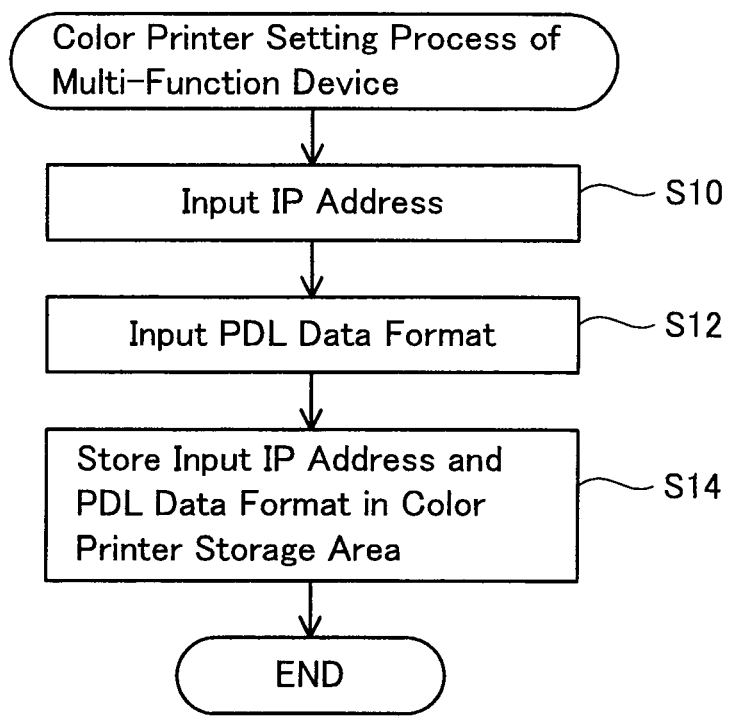
FIG. 4 shows a flowchart of a color printer setting process executed by the multi-function device.

Next, processes executed by the multi-function device 10 will be described. To begin with, a color printer setting process will be described. FIG. 4 is a flowchart of the color printer setting process. The user can input an instruction for setting one color printer at the multi-function device 10 by operating the operation unit 26. When this instruction is input, the CPU 12 executes the color printer setting process.

The CPU 12 waits until an IP address is input by the user (S10). The user can input the IP address of desired one color printer (for example, the color printer 50) into the multi-function device 10 by operating the operating unit 26. When the IP address is input, the process progresses to S12. In S12, the CPU 12 waits until information relating to a data format of PDL (Page Description Language) is input by the user. The user can input, by operating the operation unit 26, the PDL data format that the color printer (for example, color printer 50) corresponding to the IP address input in S10 can interpret. When the PDL data format is input, the process progresses to S14. In S14, the CPU 12 stores the IP address input in S10 and the PDL data format input in S12 in the color printer storage area 18. In this step, in a case where any information is already stored in the color printer storage area 18, the stored content is updated.
(Copy Process Executed by Multi-Function Device)

Figure 5:
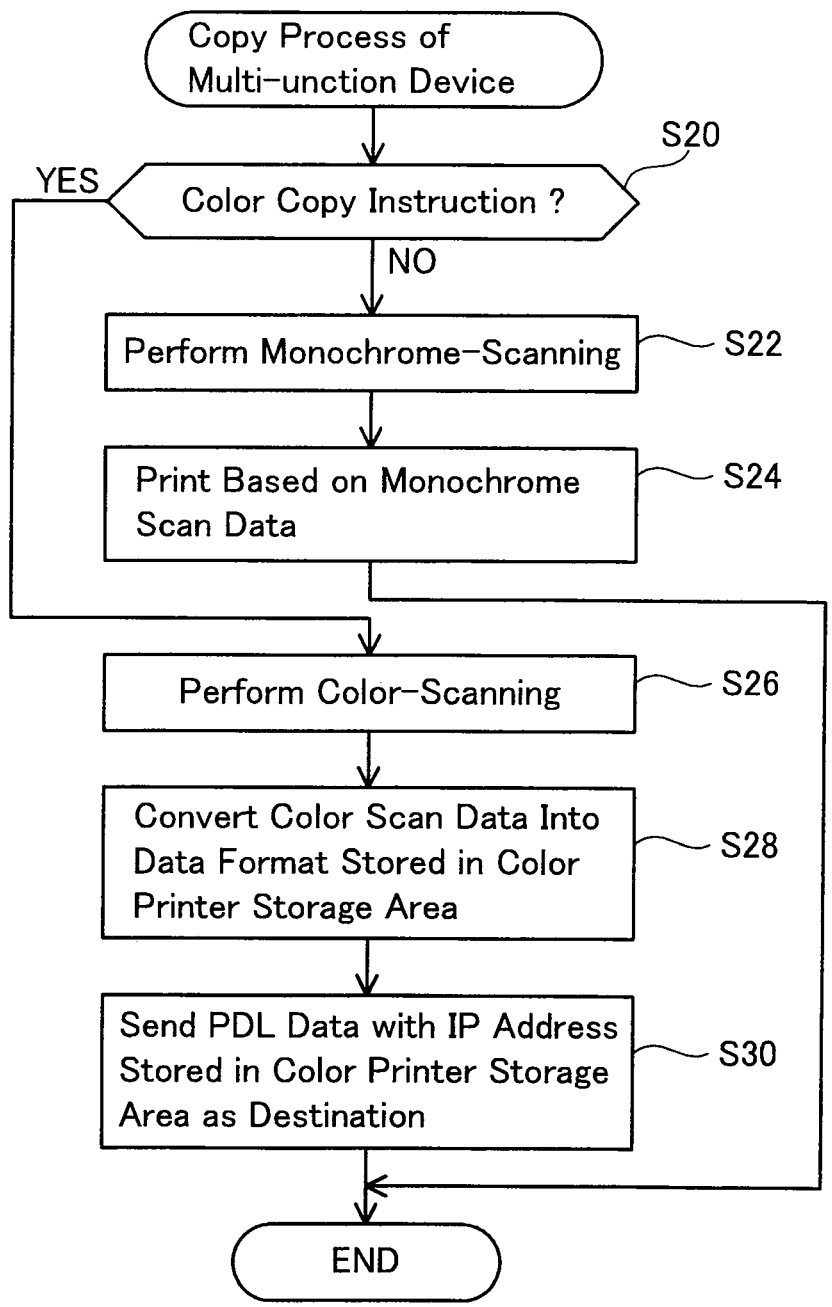
FIG. 5 shows a flowchart of a copy process executed by the multi-function device.

Next, a copy process executed by the multi-function device 10 will be described. FIG. 5 is a flowchart of the copy process. The user can input a copy instruction into the multi-function device 10 by operating the operation unit 26. When this instruction is input, the CPU 12 executes the copy process.

The user can input the copy instruction into the multi-function device 10 while selecting a monochrome copy or a color copy. The CPU 12 determines whether or not the color copy instruction is input (S20). If the determination is "NO" here (i.e. the monochrome copy is selected), the CPU 12 makes the scanning unit 24 perform monochrome-scanning (S22). Thus, the scanning unit 24 monochrome-scans an object such as a manuscript and creates monochrome scan data. Next, the CPU 12 makes the monochrome-printing unit 22 print based on the monochrome scan data (S24). Thus, the monochrome-printing unit 22 performs monochrome-printing on a print medium based on the monochrome scan data. The user can obtain the print medium that has been monochrome-printed.

On the other hand, if the determination is "YES" in S20, the CPU 12 makes the scanning unit 24 perform color-scanning (S26). Thus, the scanning unit 24 color-scans the object and creates color scan data. Next, the CPU 12 identifies the PDL data format stored in the color printer storage area 18. The CPU 12 converts the color scan data created in S26 into the identified PDL data format (S28); PDL data is thereby obtained. Then, the CPU 12 sends the PDL data obtained in S28 with the IP address stored in the color printer storage area 18 as a destination (S30).

Although it is not shown in the flowchart, the CPU 52 of the color printer 50 (or the color printer 80) monitors the reception of the PDL data sent from the multi-function device 10 in the process of S30 of FIG. 5. When the PDL data from the multi-function device 10 is received, the CPU 52 makes the color-printing unit 62 perform color-printing. Thus, the color-printing unit 62 color-prints on a print medium based on the aforementioned PDL data. The user can obtain the print medium to which the image corresponding to the object color-scanned by the multi-function device 10 is color-printed. Note that the process in which the color printer 50 performs color-printing is exemplified in FIG. 7 of the second embodiment described later.

The multi-function device 10 can store an IP address of a color printer (for example, the color printer 50). In other words, the user can designate to set a desired color printer at the multi-function device 10. The multi-function device 10 can send the PDL data corresponding to the color scan data to the color printer set by the user. As a result, the designated color printer performs color-printing, and a color-printed print medium can be provided to the user. In this embodiment, the color scan data created by the multi-function device 10 can be sent to the color printer directly. The time required to complete the color-printing can be shortened compared with a case where the color scan data is sent to the color printer via a PC. In addition, the multi-function device 10 converts the color scan data into the PDL data format that the color printer is capable of interpreting. In this configuration, a problem that the color-printing is not performed because the data that can not be interpreted by the color printer is sent to the color printer can be prevented. The performance of color-printing by the color printer based on the PDL data from the multi-function device 10 can certainly be ensured.

(Variant of the First Embodiment)

In the first embodiment, the color printer storage area 18 stores an IP address and a PDL data format of one specific color printer. However, the color printer storage area 18 may store, for each of a plurality of color printers, an IP address of the printer and a PDL data format of the color printer. In this case, the multi-function device 10 may allow the user to select one color printer from among the plurality of color printers. In S28 of FIG. 5, the CPU 12 may convert the color scan data into the PDL data format corresponding to the color printer selected by the user. In S30 of FIG. 5, the PDL data created in S28 of FIG. 5 may be sent with the IP address of the color printer selected by the user as a destination. Also, for example, the multi-function device 10 may select one IP address from among the IP addresses of the plurality of color printers in accordance with a predetermined algorithm, and store the selected IP address in the color printer storage area 18.

Note that the color printer storage area 18 of the above embodiments is an example of "an identification information storage unit". The operation unit 26 of the above embodiments is an example of "an instruction input allowing unit" and "a second identification information input allowing unit". The CPU 12, which executes the processes in accordance with the programs stored in the program storage area 16, is an example of "an image sending unit" and "a data conversion unit".

(Second Embodiment)

Next, a second embodiment will be described. The parts different from the first embodiment will mainly be described. In this embodiment, a part of the color printer setting process executed by the multi-function device 10 is different from the first embodiment.

(Color Printer Setting Process Executed by Multi-Function Device)

Figure 6:
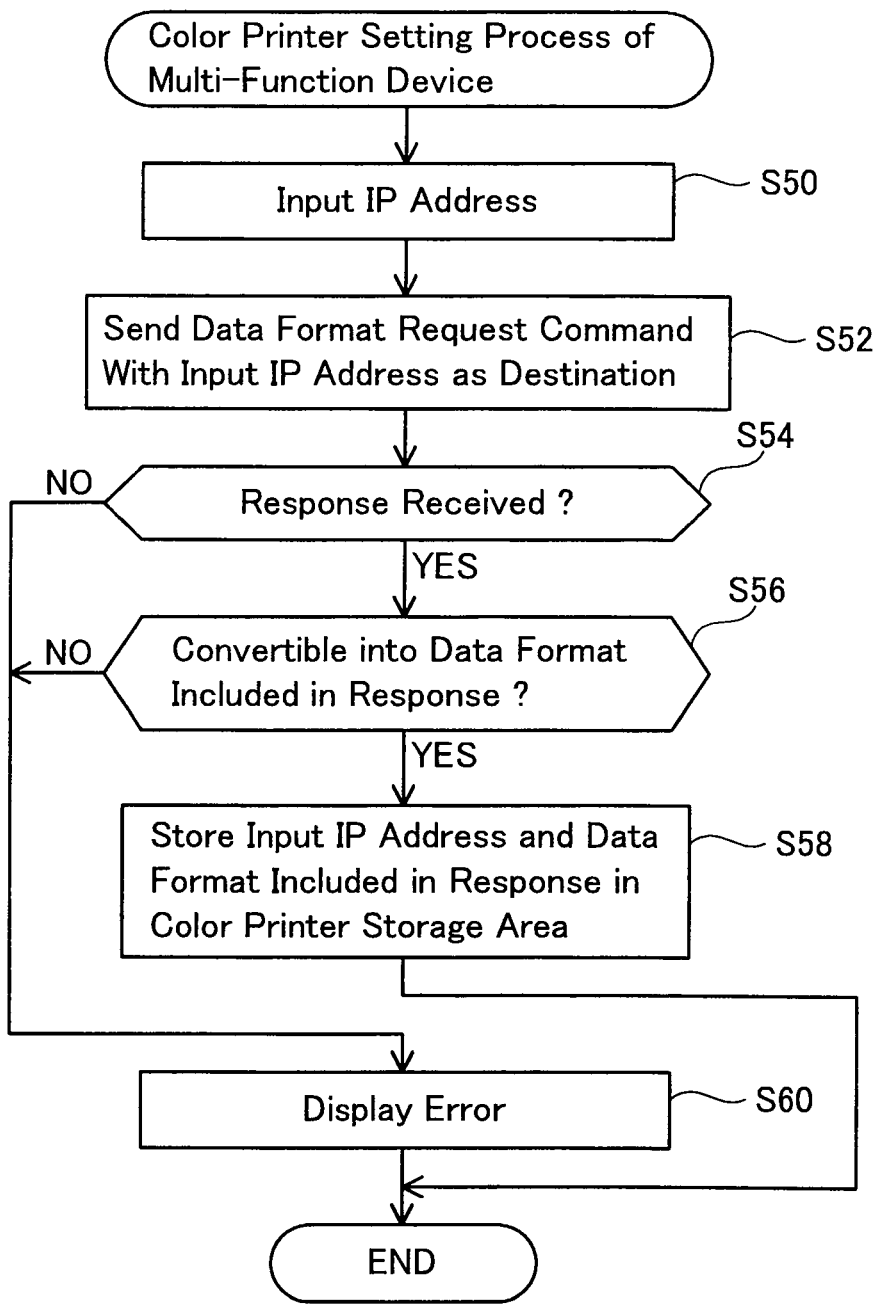
FIG. 6 shows a flowchart of a color printer setting process executed by the multi-function device of a second embodiment.

FIG. 6 is a flowchart of the color printer setting process of this embodiment. The CPU 12 waits until an IP address is input by the user (S50). This step is equal to S10 of FIG. 4. Next, the CPU 12 sends a data format request command with the input IP address as a destination (S52). As will be described in detail later, the color printer (for example, the color printer 50), which has received the data format request command, sends a response including information related to the PDL data format which can be interpreted by the color printer itself. The CPU 12 monitors the reception of the response (S54). In a case where the response is not received even though a predetermined time has elapsed after the data format request command has been sent, the determination of "NO" is made in S54. In a case where the response is received within the aforesaid predetermined time, the determination of "YES" is made in S54.

If the determination is "YES" in S54, the CPU 12 determines whether or not scan data can be converted into the PDL data format included in the response (S56). In other words, the CPU 12 determines whether or not a program to convert the scan data into the PDL data format included in the response is equipped in the program storage are 14. If the determination is "YES" in S56, the CPU 12 stores the IP address input in S50 and the PDL data format included in the response received in S54 in the color printer storage area 18 (S58). On the other hand, if the determination of "NO" is made in S54 or S56, the CPU 12 displays an error in the display unit 28 (S60). The user can thereby recognize the error and operate to set the color printer again.

(Process Executed by Color Printer)

Figure 7:
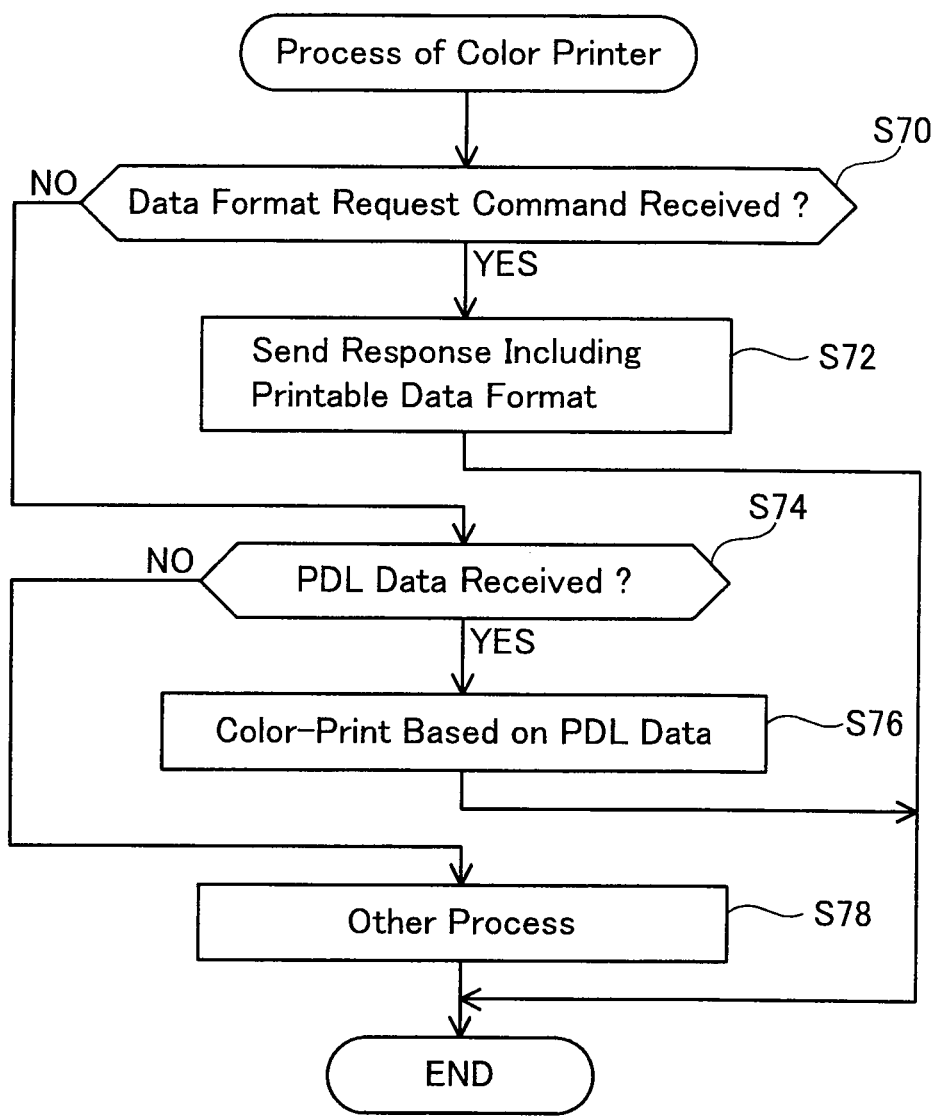
FIG. 7 shows a flowchart of a process executed by the color printer.

Next, a process executed by the color printer 50 of this embodiment will be described. Note that the color printer 80 is also capable of executing the same process. FIG. 7 is a flowchart of the process executed by the color printer 50. When some kind of command (instruction) is input into the color printer 50, the CPU 52 executes the process shown in FIG. 7.

The CPU 52 determines whether or not the data format request command sent from the multi-function device 10 (refer to S52 of FIG. 6) is received (S70). If the determination is "YES" here, the CPU 52 sends the response including the information related to the PDL data format that the color printer is capable of interpreting (S72). In addition, in a case where the color printer 50 has a plurality of interpretable PDL data formats, the CPU 52 selects one data format from among those data formats, and sends the response including information related to the selected data format.

If the determination is "NO" in S70, the CPU 52 determines whether or not the PDL data sent from the multi-function device 10 (refer to S30 of FIG. 5) is received. If the determination "YES" here, the CPU 52 makes the color-printing unit 62 perform color-printing based on the received PDL data. On the other hand, if the determination is "NO" in S74, the CPU 52 executes a process (for example, display process, printing process, etc.) corresponding to the input command (S78).

In this embodiment, the multi-function device 10 communicates with a color printer and can obtain the PDL data format that the color printer is capable of interpreting. It is not necessary for the user to input the PDL data format into the multi-function device 10. Operation burden on the user can thereby be reduced.

(Variant of the Second Embodiment)

In the second embodiment, in the case where the color printer 50 has the plurality of interpretable PDL data formats, the color printer 50 sends the response including information relevant to one PDL data format selected therefrom (refer to S72). However, the color printer 50 may also send a response including information related to more than two PDL data formats that can be interpreted by the color printer itself. In this case, the multi-function device 10 may execute any one of operations below:

(1) The multi-function device 10 may select one data format from the plurality of PDL data formats, and store the selected data format in S58 of FIG. 6;

(2) The multi-function device 10 may display the plurality of PDL data formats at the display unit 28, allow the user to select one data format from the displayed data formats, and store the data format selected by the user in S58 of FIG. 6; and (3) The multi-function device 10 may store the plurality of PDL data formats in S58 of FIG. 6. The multi-function device 10 may select one data format from the plurality of data formats when executing the process of S28 of FIG. 5.

(Third Embodiment)

Next, a third embodiment will be described. The parts different from the first embodiment will mainly be described. In this embodiment, the multi-function device 10 obtains the IP addresses and the PDL data formats of the color printers 50, 80 using the server 90.

(Configuration of Server)

Figure 8:
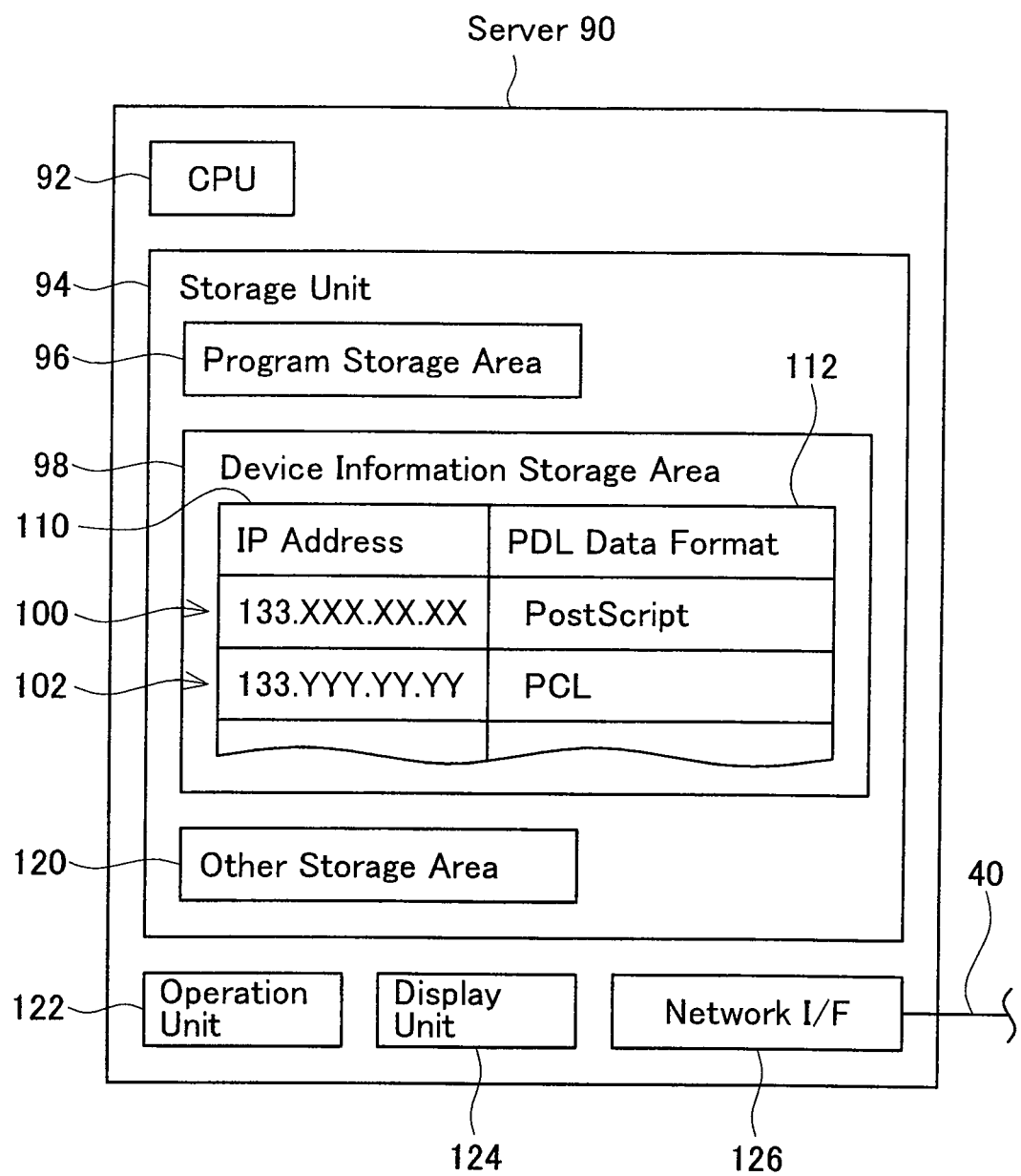
FIG. 8 shows a configuration of a server of a third embodiment.

A configuration of the server 90 will be described. As shown in FIG. 8, the server 90 comprises a CPU 92, a storage unit 94, an operation unit 122, a display unit 124, and network I/F 126, etc.

The CPU 92 executes various processes in accordance with programs stored in the storage unit 94. The processes executed by the CPU 92 will be described in detail later. The storage unit 94 includes a program storage area 96, a device information storage area 98 and another storage area 120, etc. The program storage area 96 stores the programs to be executed by the CPU 92. The device information storage area 112 can store a plurality of items of association data 100, 102. Each item of the association data is data associating an IP address 110 with a PDL data format 112. How information is stored in the device information storage area 112 will be described in detail later. The storage area 120 can store data (data created in processes, etc.) other than the data to be stored in the storage area 96, 98.

The operation unit 122 is configured by a keyboard and a mouse, etc. The user can input various instructions or information into the server 90 by operating the operation unit 122. In this embodiment, the user can input the IP address and the PDL data format of each of color printers 50, 80 into the server 90 by operating the operation unit 122. The device information storage area 98 described above stores information input by the user. The display unit 124 can display a variety of information. The network I/F 126 is connected to the LAN 40. The server 90 can communicate with each device 10, 50, 80 via the network I/F 126 and the LAN 40.

(Color Printer Setting Process Executed by Multi-Function Device)

Figure 9:
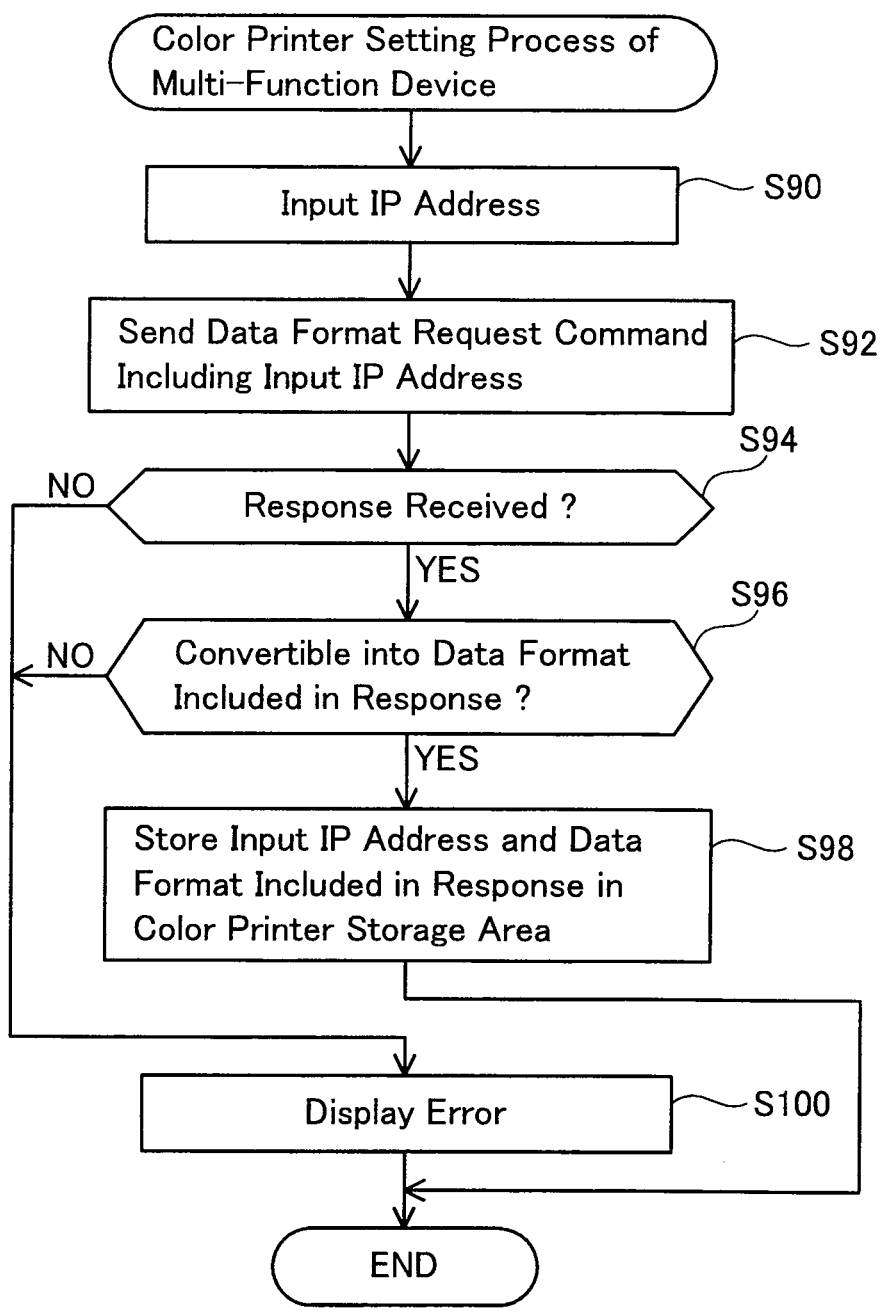
FIG. 9 shows a flowchart of a color printer setting process executed by the multi-function device.

FIG. 9 is a flowchart of the color printer setting process of this embodiment. The CPU 12 waits until an IP address is input by the user (S90). This step is equal to S10 of FIG. 4. Next, the CPU 12 sends a data format request command including the IP address input in S90 to the server 90 (S92). The IP address of the server 90 has been already stored in the storage area 20 of the multi-function device 10 (set by the user). The CPU 12 sends the data format request command with the IP address of the server 90 as a destination in S92. As will be described in detail later, the server 90, which has received the data format request command, sends a response including the PDL data format corresponding to the IP address included in that command. The CPU 12 monitors the reception of the response (S94). In a case where the response is not received even if a predetermined time has passed after the data format request command was sent, the determination of "NO" is made in S94. In a case where the response is received in the above predetermined time, the determination of "YES" is made in S94.

If the determination is "YES" in S94, the CPU 12 determines whether or not scan data can be converted into the PDL data format included in the response (S96). If the determination is "YES" in S96, the CPU 12 stores the IP address input in S90 and the PDL data format included in the response received in S94 in the color printer storage area 18 (S98). On the other hand, if the determination is "NO" in S94 or S96, the CPU 12 displays an error in the display unit 28 (S100).

(Process Executed by Server)

Figure 10:
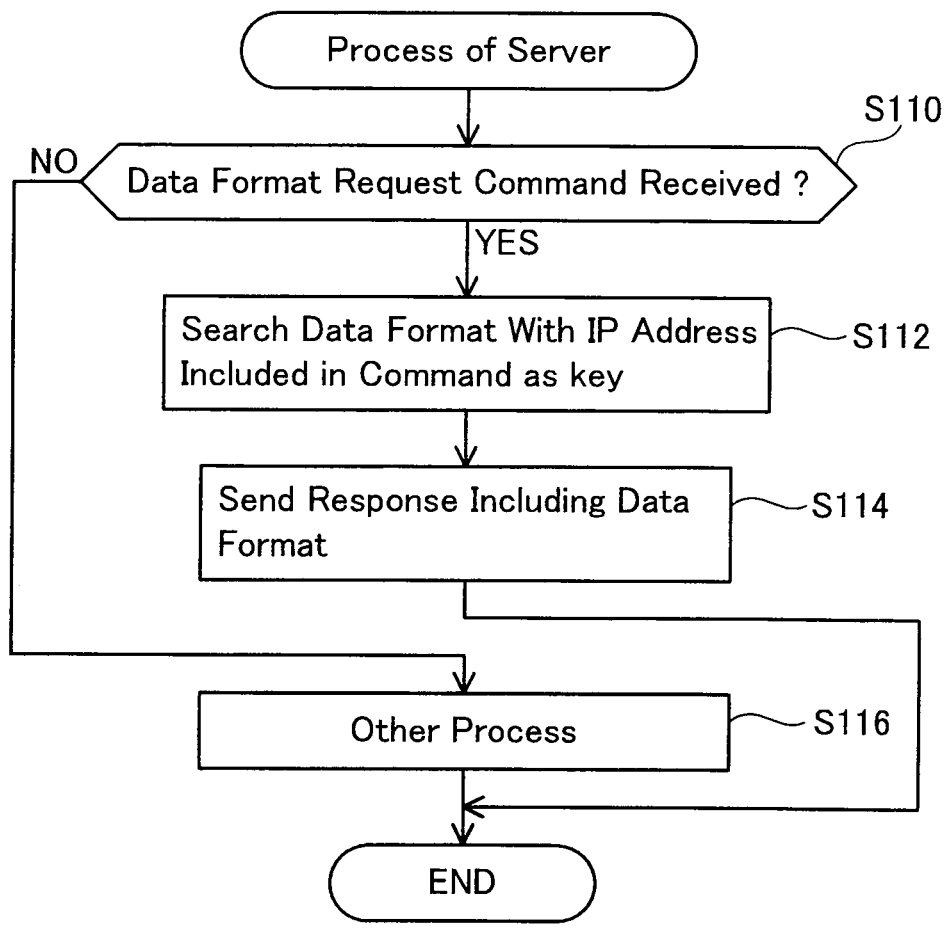
FIG. 10 shows a flowchart of a process executed by the server.

Next, a process executed by the server 90 will be described. FIG. 10 is a flowchart of the process executed by the server 90. When some kind of command (instruction) is input into the server 90, the CPU 92 executes the process shown in FIG. 10. Note that although it is not shown in FIG. 10, as described above, the user can input the IP address and the PDL data format of each of the color printers 50, 80 into the server 90 by operating the operation unit 122. In this case, the CPU 92 stores the association data 100, 102 in the device information storage area 98.

The CPU 92 determines whether or not the data format request command sent from the multi-function device 10 (refer to S92 of FIG. 9) is received (S110). If the determination is "YES" here, the CPU 92 searches the device information storage area 98 using the IP address included in the data format request command as a search key and identifies the PDL data format associated with that IP address (S112). The server 90 sends a response including information related to the PDL data format identified in S112 (S114). On the other hand, in a case where the PDL data format is not identified in S112, the server 90 does not send the response. In this case, the multi-function device 10 determines "NO" in S94 of FIG. 9. If the determination is "NO" in S110, the CPU 92 executes a process designated by the input command (S116).

In this embodiment, the multi-function device 10 communicates with server 90 and can obtain the PDL data format that the color printer is capable of interpreting. It is not necessary for the user to input the PDL data format into the multi-function device 10. Operation burden on the user can thereby be reduced.

(First Variant of the Third Embodiment)

In the third embodiment, the user inputs the IP address and the PDL data format of each of the color printers 50, 80 into the server 90. However, the sever 90 may obtain the IP address and the PDL data format of each of the color printers 50, 80 by communicating with the color printer 50, 80. For example, the server 90 may broadcast a predetermined command. In response to the reception of the above command, the color printers 50, 80, may respectively send a response including their own IP address and the PDL data format that the respective color printer is capable of interpreting. The server 90 may store the association data which associates the IP address with the PDL data format included in the response in the device information storage area 98.

(Second Variant of the Third Embodiment)

Moreover, the server 90 may allow the user to input only the IP address of each of the color printers 50, 80. The server 90 may unicast a predetermined command to each color printer 50, 80. In response to the reception of the above command, each color printer 50, 80 may send a response including the PDL data format that the respective printer is capable of interpreting. The server 90 may store the association data which associates the IP address of the destination of unicasting with the PDL data format included in the response in the device information storage area 98.

(Fourth Embodiment)

Next, the fourth embodiment will be described. The parts different from the first embodiment will mainly be described. In this embodiment, a part of the color printer setting process executed by the multi-function device 10 is different from the first embodiment.

(Color Printer Setting Process Executed by Multi-Function Device)

Figure 11:
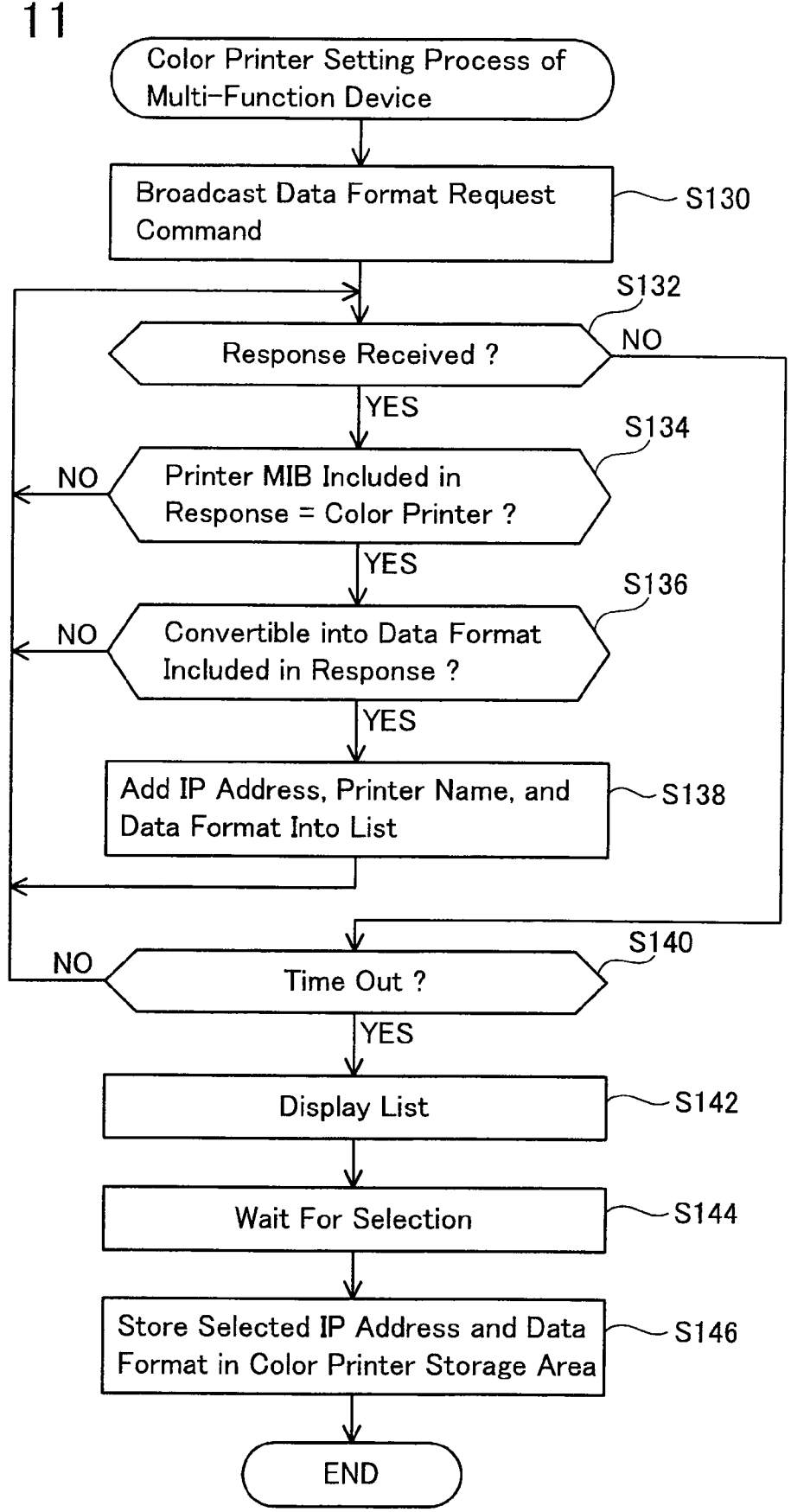
FIG. 11 shows a flowchart of a color printer setting process executed by the multi-function device of a fourth embodiment.

FIG. 11 is a flowchart of the color printer setting process of this embodiment. The CPU 12 broadcasts a data format request command (S130). In other words, the CPU 12 sends the data format request command whose destination is unspecified. As will be described in detail later, a color printer (for example, the color printer 50) sends a response including its own IP address, information related to one type of PDL data format which can be interpreted by itself, its own printer name, and its Printer MIB. The Printer MIB includes an identifier indicating whether or not color-printing can be performed.

The CPU 12 monitors the reception of the response (S132). If the determination is "YES" here, the CPU 12 determines whether or not the color-printing can be performed based on the Printer MIB included in the response (S134). If the determination is "YES" here, the CPU 12 determines whether or not scan data can be converted into the PDL data format included in the response (S136). If the determination is "YES" here, the CPU 12 adds information, in which the IP address, the printer name, and the PDL data format included in the response are associated, into a list (S138). This list is created in the storage area 20. When S138 ends, the process returns to S132 and the reception of the response is monitored. If the determination is "NO" in S134 or S136, the process skips S138 and returns to S132. If the determination is "YES" in S132 again, the processes subsequent to S134 are executed again. In this manner, the information (the IP address, the printer name, and the PDL data format) corresponding to each color printer 50, 80 is respectively added into the above list.

The CPU 12 monitors the elapsing of the predetermined time after the data format request command is sent (S140). If the determination is "YES" here, the CPU 12 displays the above list (S142) in the display unit 28. The CPU 12 waits until the user selects at least one item of information (at least one color printer) from the above list (S144). The user can select a color printer by operating the operation unit 26. Then, the CPU 12 stores the IP address and the PDL data format of the color printer selected by the user in the color printer storage area 18 (S146).

(Process Executed by Color Printer)

Figure 12:
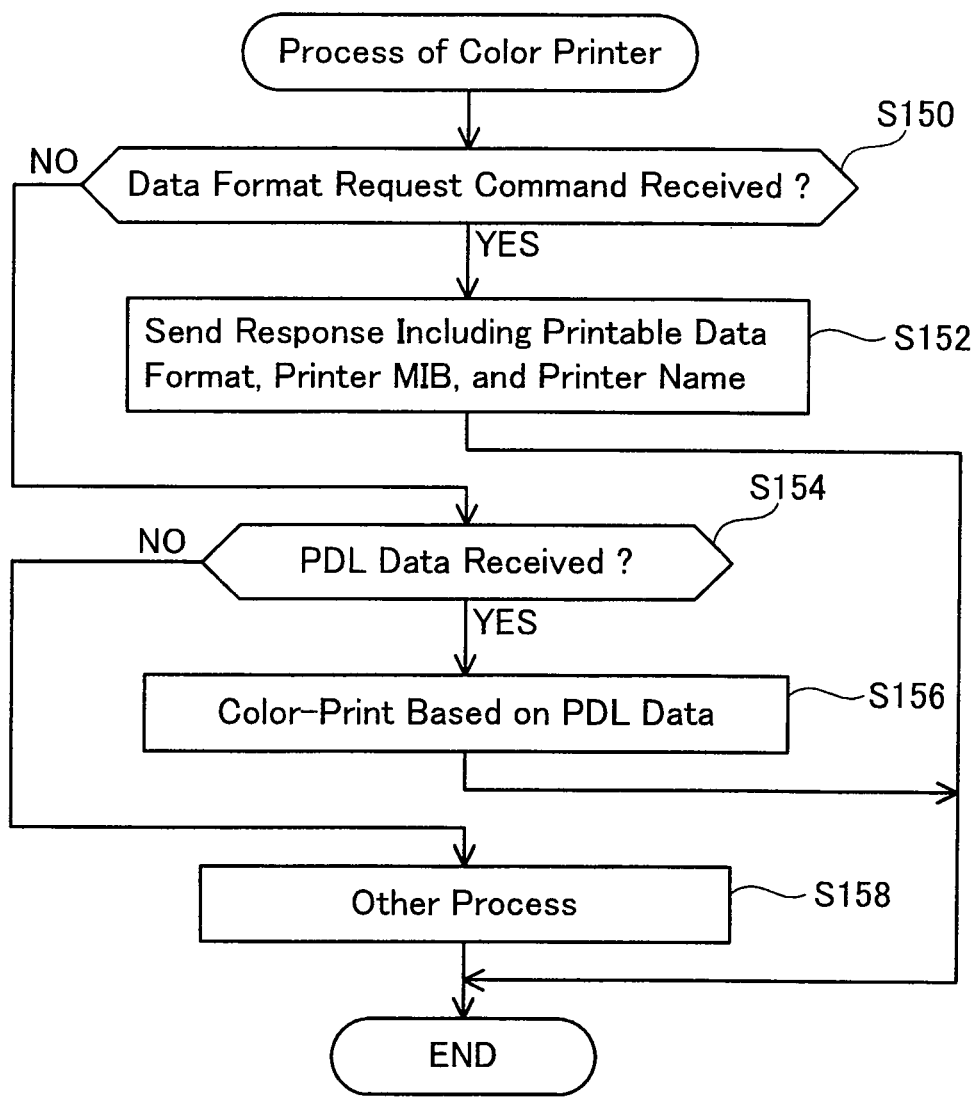
FIG. 12 shows a flowchart of a process executed by the color printer.

Next, a process executed by the color printer 50 will be described. Note that the color printer 80 is also capable of executing the same process. FIG. 12 is a flowchart of the process executed by the color printer 50.

The CPU 52 determines whether or not the data format request command (refer to S130 of FIG. 11) sent from the multi-function device 10 is received (S150). If the determination is "YES" here, the CPU 52 sends a response including its own IP address, information of the PDL data format that can be interpreted by itself, its own printer name, and its own Printer MIB (S152). The contents of the processes S154 to S158 executed in a case where the determination is "NO " in S150 are the same as those of S74-S78 of FIG. 7.

In this embodiment, the multi-function device 10 can obtain the IP address and the PDL data format of each of the color printers 50, 80 by broadcasting. It is not necessary for the user to input the IP address and the PDL data format of the color printer into the multi-function device 10. Operation burden on the user can be reduced. In addition, the user can select one color printer from among the plurality of color printers. Note that the storage area 20 storing the list in this embodiment is an example of "a color printers storage unit", and the operation unit 26 is an example of "a selection unit".

(Variant of the Fourth Embodiment)

In the fourth embodiment, the multi-function device 10 displays the list of more than one color printer searched by broadcasting, allows the user to select at least one color printer from those, and stores the color printer selected by the user into the color printer storage area 18. However, the multi-function device 10 may automatically store one or more color printer obtained as the result of the search without allowing the user to select. Also, for example, the multi-function device 10 may select at least one IP address from the IP addresses of the plurality of color printers included in the list in accordance with a predetermined algorism.

(Fifth Embodiment)

Next, the fifth embodiment will be described. The parts different from the first embodiment will mainly be described. In this embodiment, a part of the copy process executed by the multi-function device 10 is different from the first embodiment.

(Copy Process Executed by Multi-Function Device)

Figure 13:
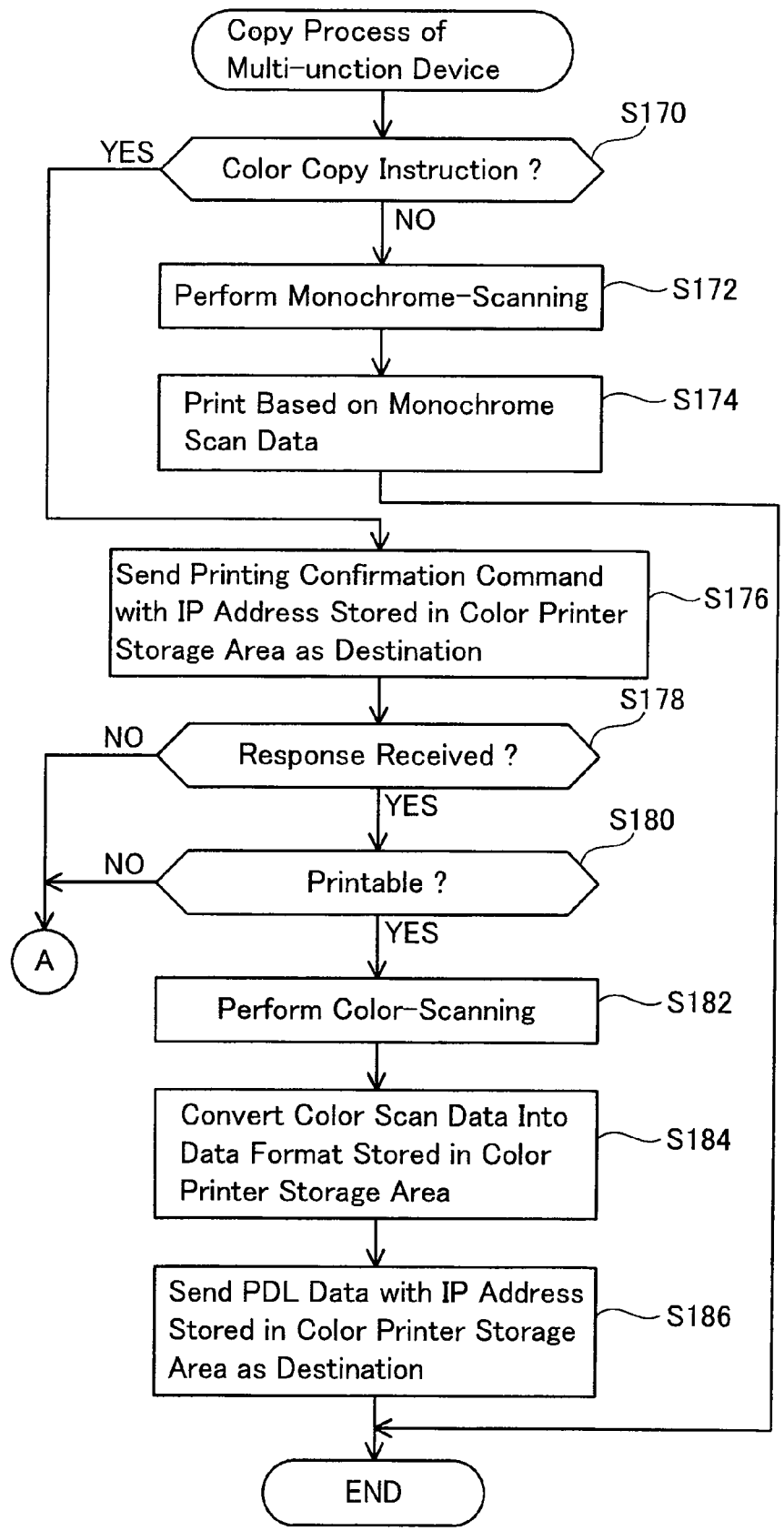
FIG. 13 shows a flowchart of a copy process executed by the multi-function device of a fifth embodiment.

FIG. 13 is a flowchart of the copy process of this embodiment. The processes S170 to S174 are the same as S20 to S24 of FIG. 5. If the determination is "YES" in S170, the CPU 12 sends a printing confirmation command with the IP address stored in the color printer storage area 18 as a destination (S176). As will be described in detail later, a color printer (for example the color printer 50), which has received the printing confirmation command, sends a response including an identifier indicating whether or not printing can be performed. The CPU 12 monitors the reception of the response (S178). In a case where the response is not received even if a predetermined time has elapsed after the printing confirmation command was sent, the determination of "NO" is made in S178. For example, in a case where the power of the color printer is off, the response is not sent. In this case, the determination of "NO" is made in S178. In a case where the response is received in the above predetermined time, the determination of "YES" is made in S178.

If the determination is "YES" in S178, the CPU 12 determines whether the color printer can print based on the identifier included in the response (S180). If the determination is "YES" here, the CPU 12 executes the processes of S182 to S186. The processes of S182 to 186 are the same as those of S26 to S30 of FIG. 5.

Figure 14:
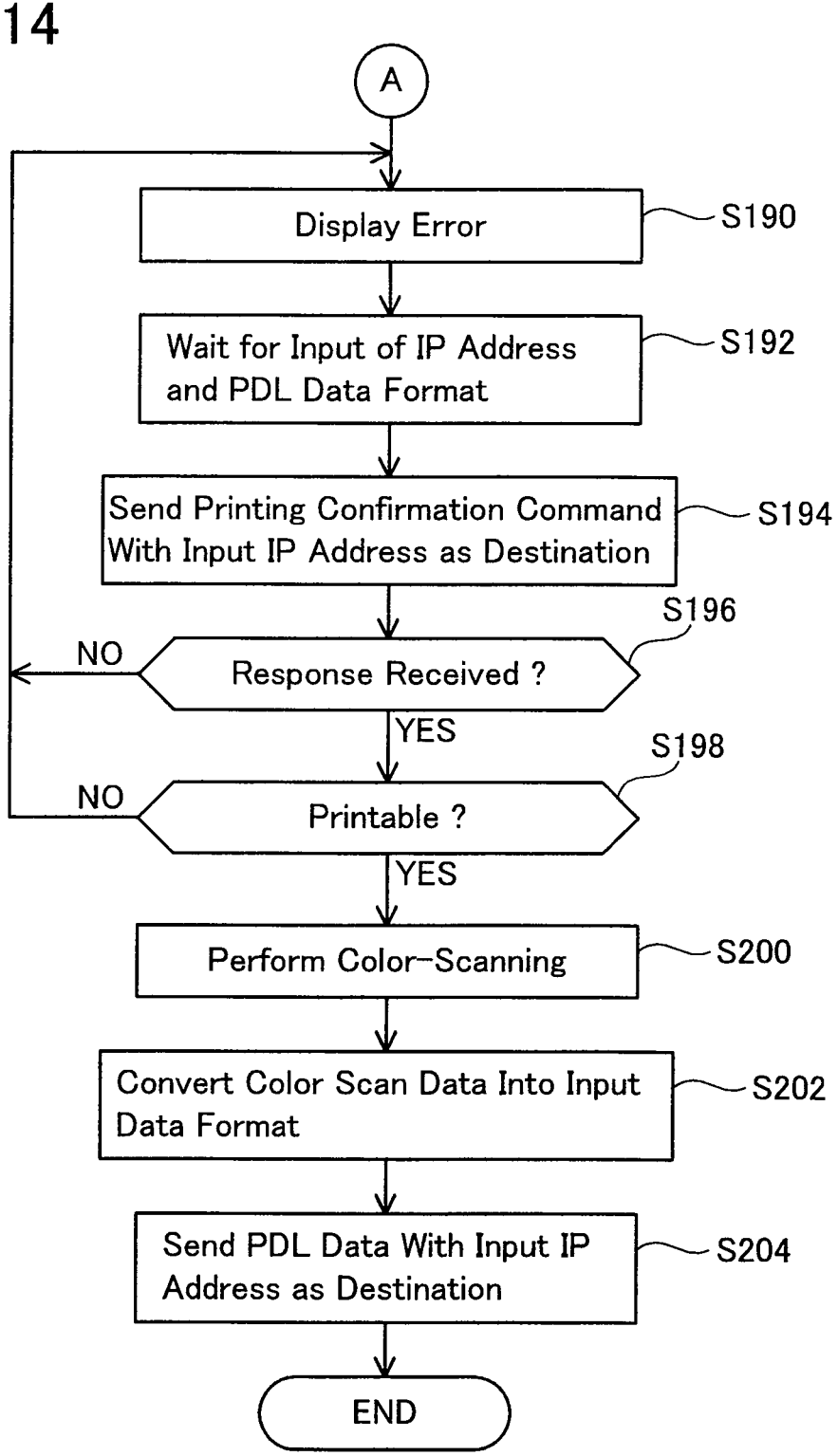
FIG. 14 shows a subsequent flowchart of FIG. 13.

If the determination is "NO" in S178 or the determination is "NO" in S 180, the process progresses to S190 of FIG. 14. In S190, the CPU 12 displays an error in the display unit 28. Next, the CPU 12 allows the user to input an IP address and a PDL data format of a printer other than the color printer stored in the color printer storage area 18 (S192). The user can input the IP address and the PDL data format of another color printer by operating the operation unit 26. The CPU 12 sends the printing confirmation command with the IP address input by the user in S192 as a destination (S194). The processes of S196 and S198 executed subsequent to S194 are the same as S178 and S180 of FIG. 13. If the determination is "NO" in S196 or S198, the CPU 12 returns to S190 and waits for an input of an IP address and a PDL data format of yet another color printer (S192).

If the determination is "YES" in S198, the CPU 12 makes the scanning unit 24 perform color-scanning (S200). Next, the CPU 12 converts the color scan data created in S200 into the PDL data format input by the user in S192 (S202). Subsequently, the CPU 12 sends the PDL data obtained in S202 with the IP address input by the user in S192 as a destination (S204).

(Process Executed by Color Printer)

Figure 15:
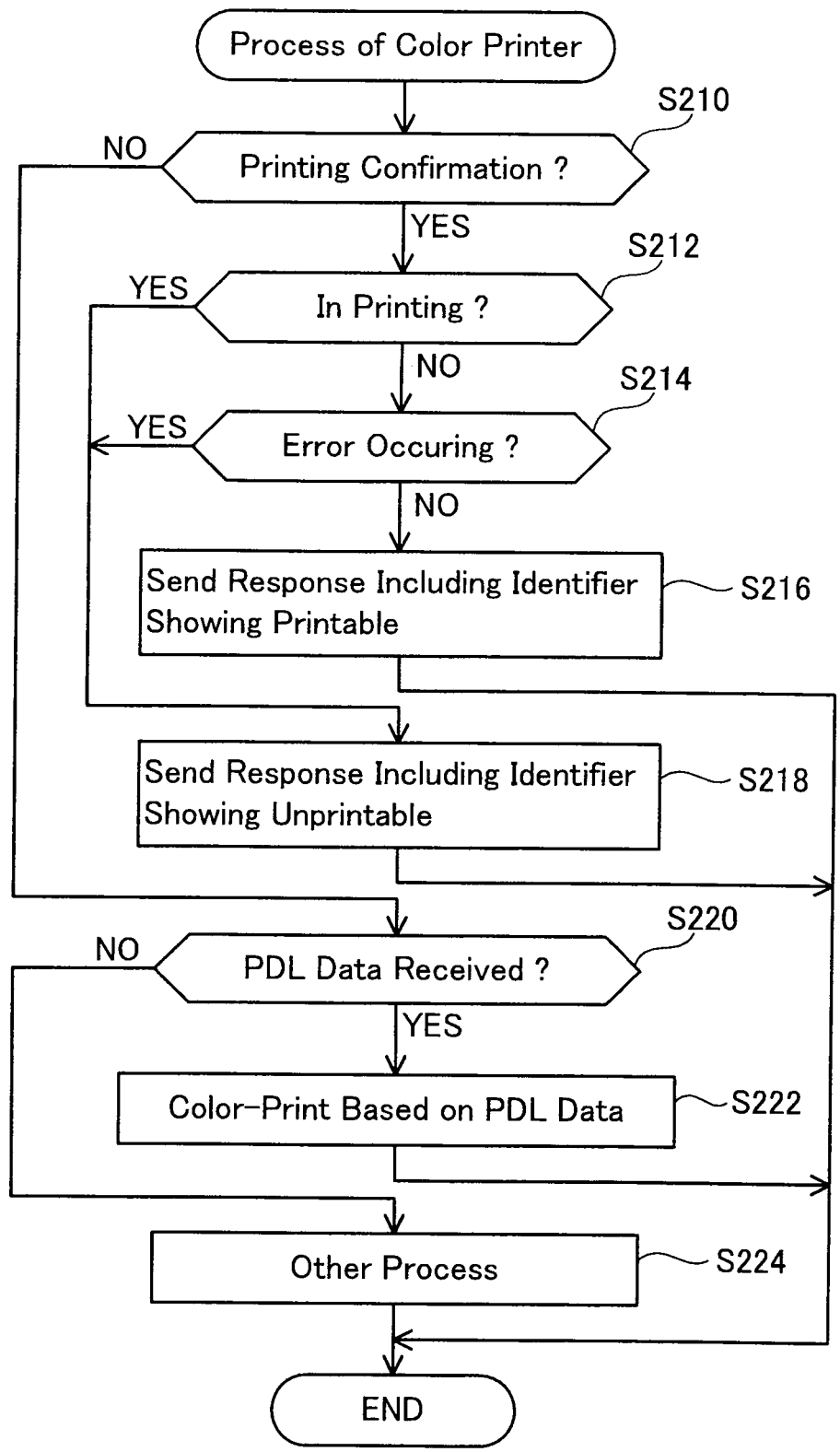
FIG. 15 shows a flowchart of a process executed by the color printer.

Next, a process executed by the color printer 50 of this embodiment will be described. Note that the color printer 80 is also capable of executing the same process. FIG. 15 is a flowchart of the process executed by the color printer 50.

The CPU 52 determines whether or not the printing confirmation command (refer to S176 of FIG. 13 and S194 of FIG. 14) sent from the multi-function device 10 is received (S210). If the determination is "YES" here, the CPU 52 determines whether or not the CPU 52 itself is in executing a printing job (S212). If the determination is "NO" here, the CPU 52 determines whether or not the CPU 52 itself is in an error state (for example, paper jam, running out of ink or toner, etc.). If the determination is "NO" here, the CPU 12 sends a response including an identifier indicating that printing can be performed (S216). On the other hand, if the determination is "YES" in S212 or S214, the CPU 12 sends a response including an identifier indicating that printing can not be performed (S218). Note that the processes of S220 to S224 executed if the determination is "NO" in S210 are the same as S74 to S78 of FIG. 7.

In this embodiment, in a case where the color printer set at the multi-function device 10 (i.e. the color printer having the IP address stored in the color printer storage area 18) is in a state which printing can not be performed, the multi-function device 10 allows the user to select another color printer for performing color-printing. For example, in a case where the color printer 50 set at the multi-function device 10 is executing a printing job, the color printer 80 can perform the color-printing. Therefore, color-print can be performed without waiting for the printing job currently taking place to end, and the desired color-printing can be started earlier. Also, for example, even if the color printer 50 set at the multi-function device 10 is in the error state, the desired color-printing can be performed by the other color printer 80, and thus the desired color printing can surely be performed. Note that the operation unit 26 of this embodiment is an example of "a first identification information input allowing unit".

(First Variant of the Fifth Embodiment)

The multi-function device 10 may search another color printer if the determination is "NO" in S178 or S180 of FIG. 13. For example, the multi-function device 10 can search the other color printer using the method of the fourth embodiment (the method to broadcast a predetermined command). In this case, for example, the multi-function device 10 may allow the user to select at least one color printer from among the plurality of color printers obtained as the result of the search, and send the PDL data to the color printer selected by the user. Alternately, for example, the multi-function device 10 may send the PDL data to the color printer obtained as the result of the search without allowing the user to select.

(Second Variant of the Fifth Embodiment)

The color printers 50, 80 may execute only the determination process of S214 without executing the determination process of S212 of FIG. 15. Also, the color printers 50, 80 may execute only the determination process of S212 without executing the determination process of S214 of FIG. 15.

(Third Variant of the Fifth Embodiment)

The multi-function device 10 may obtain a response including a status of a color printer in S178. In this case, the multi-function device 10 may determine whether the color printer is in a printable state or in an unprintable state based on the obtained status in S180. The execution of the printing job, the occurrence of the error, and the power being off can be cited as the examples of the unprintable state.

Other variant embodiments of the above-mentioned embodiments are listed below.

(1) The multi-function device 10 may comprise another function (for example, facsimile function, telephone function, etc.). Also, the color printers 50, 80 may comprise another function (for example, scan function, facsimile function, telephone function, etc.).

(2) The multi-function device 10 may allow the user to input the PDL data format. The multi-function device 10 may send a command inquiring an interpretable PDL data format to each color printer 50, 80. Each color printer 50, 80 may send a response including the PDL data format that can be interpreted by itself. The multi-function device 10 may display a list (IP addresses, printer names, etc.) including the data format which is identical to the PDL data format input by the user, allow the user to select at least one color printer from the list, and store the information (the IP address and the PDL data format) corresponding to the color printer selected by the user into the color printer storage area 18.

(3) The multi-function device 10 may allow the user to input a model type of a printer (or a printer name). The multi-function device 10 may send a command inquiring a model type and an interpretable PDL data format to each color printer 50, 80. Each color printer 50, 80 may send a response including its own model type and its interpretable PDL data format. The multi-function device 10 may display the list (IP addresses, printer names, etc.) including the model type which is identical to the model type input by the user, allow the user to select at least one color printer from the list, and store the information (the IP address and the PDL data format) corresponding to the color printer selected by the user into the color printer storage area 18.

(4) The plurality of techniques described in each of the embodiments and variant embodiments described above can be used solely or in various combinations.

What is claimed is:

1. A multi-function device comprising:
   an information obtaining unit configured to obtain, from each of a plurality of color printers, identification information of the color printer and a data format that the color printer is capable of interpreting;
   a color printer storage unit configured to store, for each of the plurality of color printers, an association of the identification information of the color printer and the data format that the color printer is capable of interpreting;
   a selection unit configured to select identification information of a specific color printer from a plurality of identification information stored in the color printer storage unit;
   a data format obtaining unit configured to obtain, from the color printer storage unit, a specific data format being associated with the identification information of the specific color printer;
   a color-scanning unit configured to color-scan an object to be scanned;
   a monochrome-printing unit configured to monochrome-print based on first image data representing an object scanned by the color-scanning unit;
   an inquiring unit configured to inquire with the identification information of the specific color printer selected by the selection unit as a destination, whether the specific color printer is in a printable state;
   a data conversion unit configured to convert specific image data representing an object color-scanned by the color-scanning unit into second image data having the specific data format after receiving a response from the specific color printer indicating that the specific color printer is in the printable state;

an instruction input allowing unit configured to allow a user to input an instruction; and an image sending unit configured to send the second image data representing the object color-scanned by the color-scanning unit with the identification information of the specific color printer selected by the selection unit as a destination, if a predetermined instruction is input in the instruction input allowing unit.

2. The multi-function device as in claim 1, wherein the image sending unit is configured to send the second image data with particular identification information of another color printer as a destination if the predetermined instruction is input in the instruction input allowing unit and the response indicating that the specific color printer is in the printable state is not received from the specific color printer.

3. The multi-function device as in claim 2, further comprising:

an identification information input allowing unit configured to allow the user to input the particular identification information of the other color printer if the predetermined instruction is input in the instruction input allowing unit and the response indicating that the specific color printer is in the printable state is not received from the specific color printer wherein the image sending unit is configured to send the second image data with the particular identification information inputted in the identification information input allowing unit as a destination.

4. The multi-function device as in claim 1, wherein the monochrome-printing unit is not capable of color-printing.

5. A multi-function device comprising:

a color printer storage unit;

an input unit configured to receive user input;

a color-scanning unit configured to color-scan an object to be scanned;

a monochrome-printing unit configured to monochrome-print based on first image data representing the object scanned by the color-scanning unit;

a processing unit;

a computer readable storage medium storing instructions that, when executed by the processing unit, cause the multi-function device to perform operations including obtaining, from each of a plurality of color printers, identification information of the color printer and a data format that the color printer is capable of interpreting;

storing in the color printer storage unit, for each of the plurality of color printers, an association of the identification information of the color printer and the data format that the color printer is capable of interpreting;

retrieving, based on a selection received by the input unit, identification information of a specific color printer from the identification information stored in the color printer storage unit;

obtaining, from the color printer storage unit, a specific data format being associated with the identification information of the specific color printer;

inquiring with the retrieved identification information of the specific color printer as a destination, whether the specific color printer is in a printable state;

converting specific image data representing an object color-scanned by the color-scanning unit into second image data having the specific data format after receiving a response from the specific color printer indicating that the specific color printer is in the printable state; and sending the second image data representing the object color-scanned by the color-scanning unit with the retrieved identification information of the specific color printer as a destination, if a predetermined instruction is input in the input unit.

6. The multi-function device as in claim 5, wherein the operation of sending the second image data with particular identification information of another color printer as a destination is performed if the predetermined instruction is input in the input unit and the response indicating that the specific color printer is in the printable state is not received from the specific color printer.

7. The multi-function device as in claim 6, wherein the instructions, when executed by the processing unit, further cause the multi-function device to perform operations including:

allowing the user to input the particular identification information of the other color printer if the predetermined instruction is input in the input unit and the response indicating that the specific color printer is in the printable state is not received from the specific color printer, wherein the operation of sending the second image data with the particular identification information inputted as a destination.

8. The multi-function device as in claim 5, wherein the monochrome-printing unit is not capable of color-printing.

* * * * *

UNITED STATES PATENT AND TRADEMARK OFFICE
CERTIFICATE OF CORRECTION

Page 1 of 1

PATENT NO.        : 8,625,116 B2
APPLICATION NO.   : 12/551598
DATED             : January 7, 2014
INVENTOR(S)       : Hiroshi Hattori It is certified that error appears in the above-identified patent and that said Letters Patent is hereby corrected as shown below:

On the Title Page, item (73) under Assignee:
Please insert --(JP)-- after "Nagoya-shi, Aichi-ken"

Signed and Sealed this
Twenty-fourth Day of November, 2015

Michelle K. Lee
*Director of the United States Patent and Trademark Office*